(12) United States Patent
Autran

(10) Patent No.: US 10,994,656 B2
(45) Date of Patent: May 4, 2021

(54) DEVICE AND METHOD FOR REAR-VIEW VISION WITH ELECTRONIC DISPLAY FOR A VEHICLE

(71) Applicant: Valeo Systemes Thermiques, Le Mesnil Saint Denis (FR)

(72) Inventor: Frédéric Autran, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 154 days.

(21) Appl. No.: 15/108,808

(22) PCT Filed: Dec. 18, 2014

(86) PCT No.: PCT/FR2014/000291
§ 371 (c)(1),
(2) Date: Jun. 29, 2016

(87) PCT Pub. No.: WO2015/101724
PCT Pub. Date: Jul. 9, 2015

(65) Prior Publication Data
US 2016/0325678 A1    Nov. 10, 2016

(30) Foreign Application Priority Data

Dec. 30, 2013    (FR) ...................................... 1363692

(51) Int. Cl.
*B60R 1/00*    (2006.01)
*G06F 3/01*    (2006.01)
*H04N 7/18*    (2006.01)

(52) U.S. Cl.
CPC ................ *B60R 1/00* (2013.01); *G06F 3/012* (2013.01); *H04N 7/181* (2013.01);
(Continued)

(58) Field of Classification Search
CPC . B60R 1/00; B60R 2300/105; B60R 2300/70; B60R 2300/8066; G06F 3/012; H04N 7/181
(Continued)

(56) References Cited

U.S. PATENT DOCUMENTS

| 9,139,135 B2 * | 9/2015 | Assaf ........................ B60R 1/12 |
| 2003/0151563 A1 * | 8/2003 | Kulas ...................... B60K 35/00 345/7 |

(Continued)

FOREIGN PATENT DOCUMENTS

| DE | 10 2008 059269 A1 | 6/2010 |
| WO | 96/38319 A2 | 12/1996 |

(Continued)

OTHER PUBLICATIONS

International Search Report issued in PCT/FR2014/000291 dated Mar. 5, 2015 (2 pages).

(Continued)

*Primary Examiner* — Farzana Hossain
(74) *Attorney, Agent, or Firm* — Osha Bergman Watanabe & Burton LLP

(57) ABSTRACT

The invention relates to a rear-view device (1) for a vehicle able to be driven by a driver, characterized in that the device (1) comprises electronic means (40, 50, 70, 75, 80, 85) configured to receive at least one rear-view image and to allow the display of a part of said image, the part of the image displayed being selected as a function of the position of the driver.

9 Claims, 3 Drawing Sheets

1: Rear-view device
25, 35: Manual adjustment means
26, 36: Adjustment means
41, 51: Screen
42, 52, 48, 58: Transmitter
43, 53: Receiver
44, 54: Image capture means
45, 55: Image generator
46, 56: Video receiver
47, 57: Calculation unit
49, 59: Video link
60: Communication link
75, 85: First sub-assembly
90: Common sub-assembly
91: Central video transmitter

(52) U.S. Cl.
CPC ..... *B60R 2300/105* (2013.01); *B60R 2300/70* (2013.01); *B60R 2300/8066* (2013.01)

(58) Field of Classification Search
USPC .......................................................... 348/148
See application file for complete search history.

(56) References Cited

U.S. PATENT DOCUMENTS

| | | | | |
|---|---|---|---|---|
| 2003/0169213 | A1* | 9/2003 | Spero | G02B 5/20 345/7 |
| 2008/0239527 | A1* | 10/2008 | Okabe | B60Q 9/008 359/843 |
| 2009/0243963 | A1* | 10/2009 | Hotta | G02B 27/0093 345/7 |
| 2012/0314075 | A1* | 12/2012 | Cho | B60R 1/00 348/148 |
| 2013/0021446 | A1* | 1/2013 | Raz | H04N 13/0029 348/47 |
| 2013/0038732 | A1* | 2/2013 | Waite | B60R 1/00 348/148 |
| 2014/0333455 | A1* | 11/2014 | Lee | B62D 15/027 340/932.2 |
| 2014/0340516 | A1* | 11/2014 | Vojtisek | B60R 1/00 348/148 |
| 2015/0055678 | A1* | 2/2015 | Kawata | G01S 17/89 374/121 |
| 2015/0314682 | A1* | 11/2015 | Enriquez Ortiz | B60K 35/00 701/49 |

FOREIGN PATENT DOCUMENTS

| | | |
|---|---|---|
| WO | 2013/022577 A1 | 2/2013 |
| WO | 2013/144998 A1 | 10/2013 |

OTHER PUBLICATIONS

Written Opinion of the International Searching Authority issued in PCT/FR2014/000291 dated Mar. 5, 2015 (5 pages).

* cited by examiner

1: Rear-view device
10: Driver's head
25, 35: Manual adjustment means
26, 36: Adjustment means
40, 50: Assembly
41, 51: Screen
42, 52, 48, 58: Transmitter 43, 53: Receiver
44, 54: Image capture means
45, 55: Image generator
46, 56: Video receiver
47, 57: Calculation unit
49, 59: Video link
60: Communication link 1: Rear-view device
25, 35: Manual adjustment means
26, 36: Adjustment means
41, 51: Screen
42, 52, 48, 58: Transmitter
43, 53: Receiver
44, 54: Image capture means 45, 55: Image generator
46, 56: Video receiver
47, 57: Calculation unit
49, 59: Video link
60: Communication link
75, 85: First sub-assembly
70, 80: Second sub-assembly 1: Rear-view device
25, 35: Manual adjustment means
26, 36: Adjustment means
41, 51: Screen
42, 52, 48, 58: Transmitter
43, 53: Receiver
44, 54: Image capture means
45, 55: Image generator 46, 56: Video receiver
47, 57: Calculation unit
49, 59: Video link
60: Communication link
75, 85: First sub-assembly
90: Common sub-assembly
91: Central video transmitter

DEVICE AND METHOD FOR REAR-VIEW VISION WITH ELECTRONIC DISPLAY FOR A VEHICLE

BACKGROUND

The invention relates to a device and a method for rear-view vision with electronic display for a vehicle. In the motor vehicle field, rear-view vision is conventionally provided by a central rear-view mirror and a pair of side rear-view mirrors. However, there is a known way of replacing these elements with a device provided with electronic means in which cameras are associated with screens.

This device can thus be used, for example, to prevent the obscuring of the central rear-view mirror by passengers or luggage occupying the passenger compartment of the vehicle, or to omit the rear window in certain vehicles because this rear window is costly. The design and styling of this window also impose constraints. This would therefore make the central rear-view mirror ineffective.

On the other hand, side rear-view mirrors cause a non-negligible increase in the vehicle's width and have a considerable aerodynamic and acoustic effect on the design and styling of the vehicle as a whole. It has therefore already been proposed that conventional mirror-based rear-view vision systems could be replaced with rear-view vision systems assisted by small cameras, associated with screens provided inside the passenger compartment of the vehicle. These systems can also eliminate the blind spots which are usually present in mirror-based rear-view vision systems.

However, the screens have a number of drawbacks in respect of the display of the images provided by the cameras. This is because the screen size is limited by the available space in the vehicle and by its cost, as a result of which motor manufacturers have been obliged to use relatively small screens, typically with a width of less than 10 cm. Moreover, the position of the display device in the passenger compartment is constrained by the available space and by the regulations for safety in case of accident. This has the result of limiting the field of view supplied by the rear-view vision system.

It is possible to use an exterior camera with a larger field of view, and to display the whole field on the screen. In this case, however, the screen image would be compressed and the details would no longer be visible.

SUMMARY OF DISCLOSURE

The object of the invention is therefore to propose a rear-view vision device provided with electronic means enabling the driver to have rear-view vision with an extended field of view.

For this purpose, the invention proposes a rear-view vision device for a vehicle that can be driven by a driver, the device comprising at least one electronic means configured to receive at least one rear-view vision image and to allow the display of a part of said image, the part of the image displayed being selected on the basis of the driver's position.

Thus the driver simply has to change position in order to modify the part of the image that is displayed, and to obtain different rear-view vision angles, as in the case of an ordinary mirror-based rear-view vision system. Because of the invention, the device operates with electronic means which make it possible to dispense with exterior rear-view mirrors that increase the width of the vehicle.

The device also makes it possible to use smaller screens and thus to integrate the screens into the vehicle more easily. These characteristics also provide benefits in terms of reduction of the cost and weight of the rear-view vision device.

According to different embodiments of the invention, which may be considered separately or in combination:

said at least one electronic means comprises calculation means configured to select said part of the image and to enable the display of said part, display means controlled by the calculation means, and at least one means of detecting the driver's position, connected to the calculation means;

said at least one detection means comprises at least two detectors, each configured to calculate a distance between the detector and the driver, notably the driver's head, and to transmit these distances to said at least one calculation means;

the display means comprise at least one screen adapted to be placed on board said vehicle;

said at least one calculation means is configured to determine the position of the driver's head, using the distances supplied by the detectors;

said at least one display means comprises two screens, and each of the detectors is placed substantially at the position of each screen;

said at least one detection means comprises a third detector enabling the device to determine the height of the driver's head; said device comprises manual adjustment means for manually selecting the part of the image;

said device comprises means for adapting the image selection for reversing;

said device comprises image capture means configured to capture rear-view vision images, which are supplied to said at least one electronic means;

said image capture means comprise at least one camera.

The invention also relates to a method for rear-view vision with electronic display for a vehicle that can be driven by a driver, the method being used by a device provided with at least one electronic means, and comprising the following steps consisting of:

receiving at least one rear-view vision image;

selecting a part of the image on the basis of the driver's position, and supplying a signal representing said selected part of the image which can be displayed on a screen.

The invention will be more readily understood on consideration of the following description which is provided for guidance only and without limiting intent, accompanied by the appended drawings:

DETAILED DESCRIPTION

In the following description, the terms "left" and "right" are used to differentiate the elements in a vehicle. However, these terms are not in any way limiting, and serve only to simplify the understanding of the description.

Figure 1:
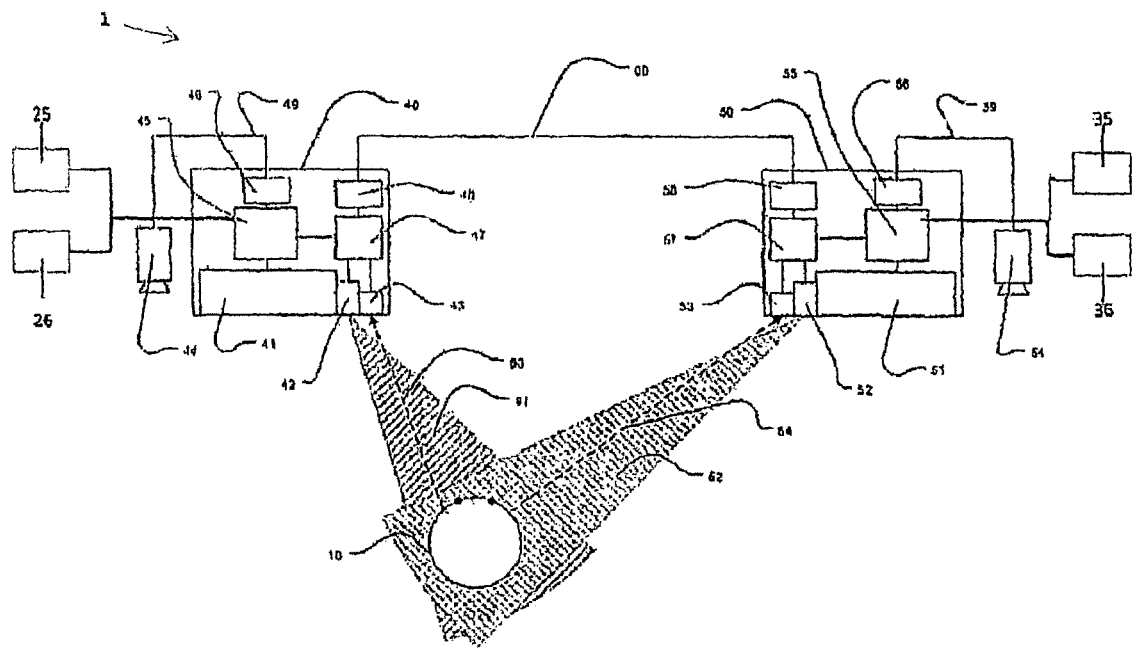
FIG. 1 is a schematic representation of a first embodiment of a rear-view vision device according to the invention.
Figure 2:
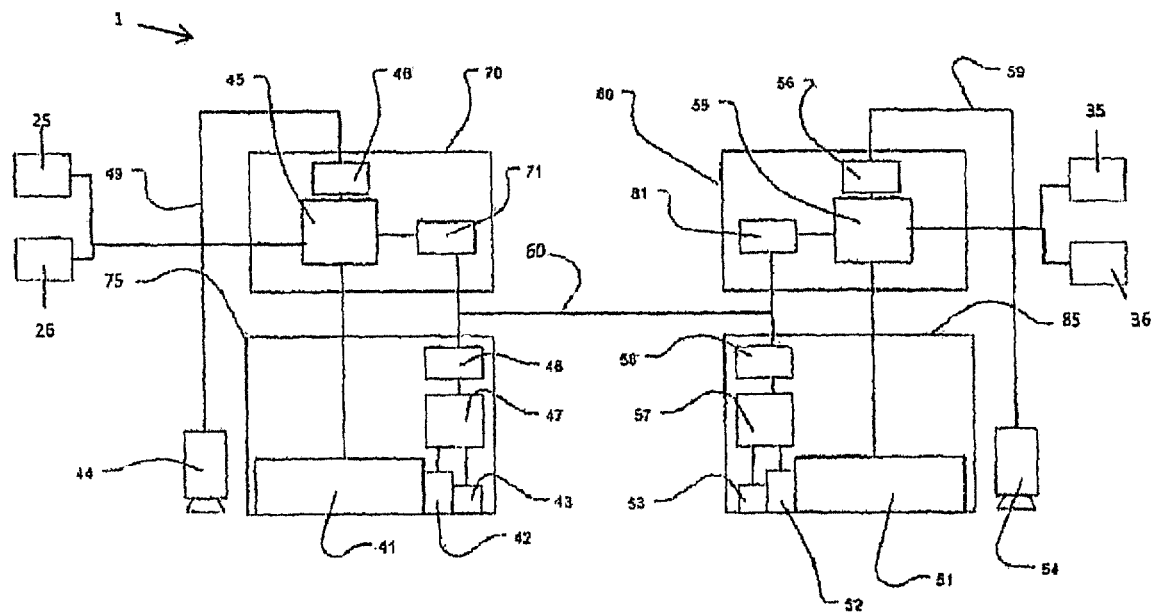
FIG. 2 is a schematic representation of a second embodiment of a rear-view vision device according to the invention.
Figure 3:
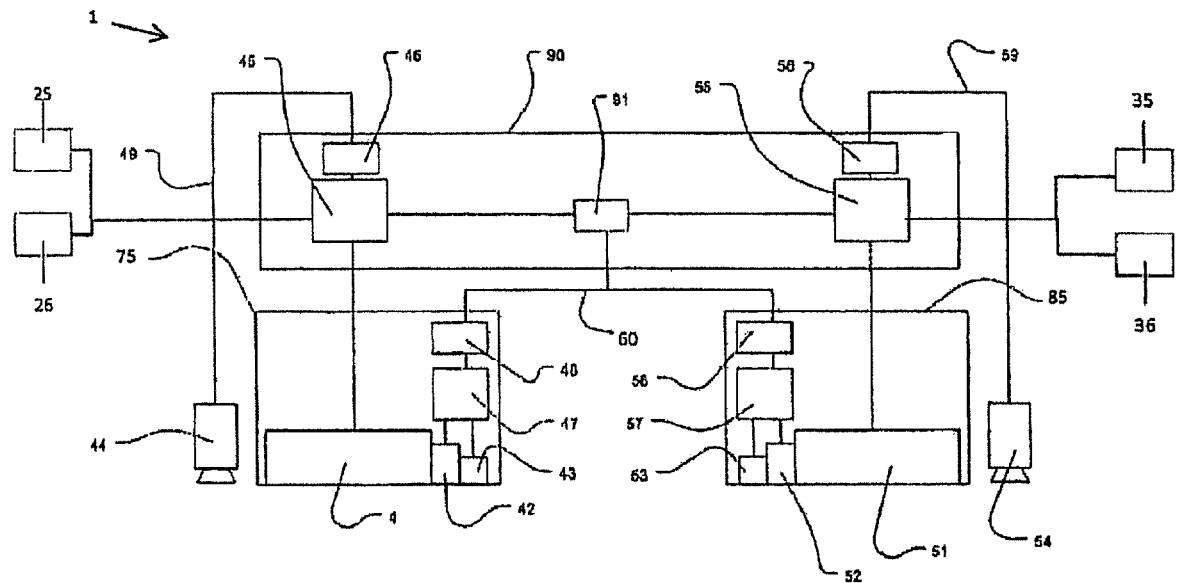
FIG. 3 is a schematic representation of a third embodiment of a rear-view vision device according to the invention.

FIGS. 1 to 3 show a rear-view vision device 1 for a vehicle that can be driven by a driver. The rear-view vision device 1 comprises at least one electronic means, and in the figures a plurality of electronic means 40, 50, 70, 75, 80, 85 configured to receive at least one rear-view vision image and to allow the display of a part of said image, the part of the image displayed being selected on the basis of the driver's position.

For this purpose, said electronic means 40, 50, 70, 75, 80, 85 comprise at least one image capture means, and in the figures two image capture means 44, 54, configured to capture rear-view vision images. Said image capture means are, for example, two cameras 44, 54, each positioned substantially at the usual position of a rear-view mirror in a vehicle (not shown in the figures), with, for example, a left-hand camera 44 and a right-hand camera 54.

For the display, said electronic means 40, 50, 70, 75, 80, 85 comprise display means 41, 51, for example two screens, namely a left-hand screen 41 and a right-hand screen 51, which can be placed on board the vehicle. Each screen 41, 51 is connected to a camera 44, 54 for displaying a part of the image captured by the camera. The screens are positioned so as to be visible to the driver.

In a variant which is not shown, the device 1 may comprise only a single rear-view vision image sensor, intended to supply an image of the same type as that formed in an interior rear-view mirror. In this case, the device comprises only a single screen.

Said electronic means 40, 50, 70, 75, 80, 85 are also provided with calculation means 45, 47, 55, 57 configured to select the part of the image on the basis of the driver's position. The calculation means 45, 47, 55, 57 comprise an image generator 45, 55 for each screen 41, 51 and units 47, 57 for calculating the driver's position. The image generator 45, 55 is an image processing unit which transmits the part of the image to be displayed in an electronic coding suitable for display on one of the screens 41, 51. The images captured by the cameras 41, 51 are transmitted by video links 49, 59 of the video receivers 46, 56, and then to the image generator 45, 55 which selects the part of the image to be displayed.

In order to estimate the position of the driver's head 10, in the variant shown in the figures, said electronic means 40, 50, 70, 75, 80, 85 are provided with detection means 42, 52, 43, 53. In this case, said detection means 42, 52, 43, 53 are two detectors, each configured to calculate a distance between the detector and the driver's head 10. A detector is provided, for example, with an infrared transmitter 42, 52 and an infrared receiver 43, 53. The transmitter 42, 52 sends an infrared beam 61, 62 toward the driver, a part 63, 64 of this beam being reflected by the driver's head 10 toward the receiver 43, 53. The reflected parts 63 and can be used to calculate the position of the driver's head 10.

In a variant which is not shown, the detector may be single, consisting for example of a camera and software for recognizing the position of the driver's head, which can also be used to monitor the risks of the driver's falling asleep.

In the case of two detectors as shown, the two measured distances are transmitted to the calculation units 47, 57 so that the latter can estimate the position of the driver's head 10 by a method of the "triangulation" type. The position is calculated in a first plane, for example in a horizontal plane with respect to the vehicle. The left-hand calculation unit 47 and the right-hand calculation unit 57 estimate the position of the driver, notably the position of his head 10, on the basis of the measurements supplied by the detectors. The calculation units 47, 57 communicate with each other by means of a left-hand transmitter 48, or two left-hand transmitters 48, 71 as detailed below, and one or two right-hand transmitters 58, 81 and a communication link 60, in order to send each other data for calculating the position of the driver's head 10.

When the position of the driver's head has been calculated, the position is supplied to the image generators 45, 55 which select the part of the image. The selection is defined on the basis of parameters relating to the configuration of the vehicle and the location of the driver. When the driver views one of the screens 41, 51, the effect obtained is the same as that of an ordinary rear-view mirror, where the driver modifies his angle of view in rear-view vision if he changes the position of his head 10.

Other types of detector may be used, such as ultrasonic, capacitive, magnetic, or radar detectors, or those using measurements of the journey time of light, for example.

To provide a more compact device, each detector is advantageously positioned substantially at the position of each screen 41, 51, in the same housing for example. The principle of the detection is as follows: if the left-hand signal increases, that is to say if the driver approaches the left-hand screen 41, and if the right-hand signal decreases at the same time, that is to say if the driver moves away from the right-hand screen 51, this means that the driver is moving his head 10 or his upper body to the left.

In a preferred embodiment, the detection means comprise a third detector (not shown), positioned in the passenger compartment, at the usual location of a central rear-view mirror for example. The third detector measures a third distance between the driver's head and the detector, and thus enables the calculation means 45, 47, 55, 57 to determine the position of the driver's head in a second plane, for example a vertical plane with respect to the vehicle, the third detector also being connected to the calculation means 45, 47, 55, 57.

Advantageously, the manual adjustment means 25, 35 may be added to the device 1 so that the part of the image to be displayed on the screen or screens 41, 51 can be selected manually. Thus the driver can adjust the part of the image to his desired angle of view. If the driver activates the manual adjustment means 25, 35, the displayed image is, for example, fixed so that he can easily use this function.

According to another variant embodiment, the device 1 comprises means 26, 36 for adapting the image selection for reversing. This is because, for reversing, the driver needs a particular angle of view. Thus the driver does not need to turn his head round in order to reverse. Moreover, advantageously, detection means arranged on the gearbox may be used for to modify the angle of view displayed on the screens 41, 51 automatically as soon as reverse gear is engaged, so as to adapt it to this situation. The adjustment means 26, 36 are advantageously configured to enable the part of the image to be displayed on the screen or screens 41, 51 to be selected manually in the case of reversing. Each of FIGS. 1 to 3 shows a rear-view vision device according to the invention, provided with the aforementioned elements, which are grouped in different configurations.

In a first configuration shown in FIG. 1, the device 1 has two assemblies 40, 50, for example a left-hand housing and a right-hand housing. Each assembly 40, 50 includes the screen 41, 51, the transmitter 42, 52, the receiver 43, 53, the calculation unit 47, 57, the image generator 45, 55, the video receiver 46, 56, and the transmitter 48, 58. On the one hand, the two assemblies 40, 50 are connected, respectively, to one of the cameras 44, 54 by the left-hand video link 49 and the right-hand video link 59, and, on the other hand, they are connected to each other by the communication link 60 between the left-hand transmitter 48 and the right-hand transmitter 58 In this case, apart from the cameras, the other elements form a single unit. The device 1 is therefore positioned at only two different locations in the passenger compartment of the vehicle. In a second configuration shown in FIG. 2, each assembly is divided into two sub-assemblies 70, 75, 80, 85. A first sub-assembly 75, 85 for detection and display includes the screen 41, 51, the transmitter 42, 52, the receiver 43, 53, the calculation unit 47, 57, and the transmitter 48, 58. A second sub-assembly 70, for image calculation includes the image generator 45, 55, the video receiver 46, 56, and a second video transmitter 71, 81. The second video transmitters 71, 81 serve to exchange data between the calculation unit 47, 57 and the image generator 45, 55 of each assembly.

The first sub-assemblies 75, 85 are connected by the communication link 60 between the left-hand transmitter 48 and the right-hand transmitter 58 in order to allow the exchange of data between the calculation units 47, 57. The image generator 45, 55 of the second sub-assembly 70, 80 is connected to the screen 41, 51 of the first sub-assembly 75, 85. Thus the first 75, 85 and second 70, 80 sub-assemblies can be positioned at different locations in the vehicle, and the screens 41, 51 of the first sub-assemblies 75, 85 must be visible to the driver.

In a third configuration shown in FIG. 3, the device 1 comprises the same first sub-assembles 75, 85 for display and detection as in the second configuration, and a common image calculation sub-assembly 90 including the image generators 45, 55, the video receivers 46, 56 and a central video transmitter 91. The common sub-assembly 90 is connected to the first sub-assemblies 75, 85, on the one hand between the central video transmitter 91 and the two right-hand 58 and left-hand 48 transmitters via the link 60, and on the other hand between each image generator 45, 55 and the screens 41, 51. The first sub-assemblies 75, 85 are connected by the communication link 60 between the left-hand transmitter 48 and the right-hand transmitter 58 in order to allow the exchange of data between the calculation units 47, 57. The cameras 44, 54 are connected to the central sub-assembly 90 on the left-hand 46 and right-hand 56 video receivers. Thus the common sub-assembly 90 can be placed at one location in the vehicle and the first sub-assemblies can be placed at locations which make the screens 41, 51 visible to the driver.

The invention claimed is:

1. A rear-view vision device for a vehicle driven by a driver, the device comprising:
   a first single camera that captures a plurality of rear-view vision images, wherein the first single camera is positioned at a typical location of a rear-view mirror of the vehicle;
   an image generator that:
      receives at least one rear-view vision image out of the plurality of rear-view vision images,
      selects a part of the at least one rear-view vision image for displaying, and
      enables displaying of said part,
      wherein the part of the at least one rear-view vision image for displaying is selected based on a position of the driver's head;
   a first screen that:
      displays the part of the at least one rear-view image selected by the image generator,
      is controlled by the image generator to display selected image parts from the first single camera as a representation of a rear-view vision from a rear-view vision angle, and
      is visible to the driver;
   a first detector that:
      detects the position of the driver's head,
      is connected to the image generator, and
      is placed at the first screen,
      wherein the part of the at least one rear-view vision image for displaying is selected based on the position of the driver's head to adjust the rear-view vision angle,
      wherein adjusting the rear-view vision angle extends a field of view of the rear-view vision;
   a second detector, each of the first and second detector being configured to:
      calculate one or more distances to the driver's head, and
      transmit the calculated distances to said image generator;
   a second screen; and
   a second single camera, wherein the second single camera is positioned adjacent to the first single camera at the typical location of the rear-view mirror of the vehicle,
   wherein the second screen is controlled by the image generator to display selected image parts from the second single camera as an additional representation of the rear-view vision from an additional rear-view vision angle,
   wherein a part of an additional rear-view vision image for displaying is selected based on the position of the driver's head to adjust the additional rear-view vision angle, and
   wherein adjusting the additional rear-view vision angle further extends the field of view of the rear-view vision such that the exterior rear-view mirrors are dispensed from the motor vehicle.

2. The rear-view vision device according to claim 1, wherein the first screen is placed onboard said vehicle.

3. The rear-view vision device according to claim 1, wherein said image generator determines the position of the driver's head, using the one or more distances supplied by the first detector and the second detector.

4. The rear-view vision device according to claim 1, wherein said device further comprises a third detector that enables the device to determine a height of the driver's head.

5. The rear-view vision device according to claim 1, further enabling the driver to manually select the part of the at least one rear-view image selected.

6. The rear-view vision device according to claim 1, further enabling the driver to adapt the image selection in response to engaging a reverse gear.

7. The rear-view vision device according to claim 1, the device further comprising at least one transmitter and at least one receiver to exchange data between the first single camera, the first screen, the first detector, and the image generator.

8. A method for rear-view vision for a vehicle that can be driven by a driver, the method being used by a device comprising a first single camera, a second single camera, an image generator, a first screen, a second screen, a first detector, and a second detector, the method comprising:
   capturing, by the first single camera and the second single camera, a plurality of rear-view vision images, the first single camera is positioned at an usual position of a rear-view mirror in the vehicle and the second single camera is positioned adjacent to the first single camera at the typical location of the rear-view mirror of the vehicle;
   receiving, by the image generator, at least one rear-view vision image out of the plurality of rear-view vision images from the first single camera and of an additional rear-view vision image from the second single camera;

selecting, by the image generator, a part of the at least one rear-view vision image for displaying and a part of the additional rear-view vision image;

enabling, by the image generator, displaying of the part of the at least one rear-view vision image and the part of the additional rear-view vision image;

displaying the part of the at least one rear-view vision selected by the image generator on the first screen, and displaying the part of the additional rear-view vision image selected by the image generator on the second screen;

controlling, by the image generator, the first screen to display selected image parts from the first single camera as a representation of a rear-view vision from a rear-view vision angle, and controlling, by the image generator, the second screen to display selected image parts from the second single camera as an additional representation of the rear-view vision from an additional rear-view vision angle;

detecting, by the first detector and the second detector, a position of the driver's head;

calculating, by the first detector and the second detector, one or more distances to the driver's head;

transmitting, by the first detector and the second detector, the one more calculated distances to the image generator; and supplying a signal representing the selected part of the at least one rear-view vision image and the selected part of the additional rear-view vision image to be displayed on the first screen and the second screen, wherein:
the first detector is placed at the first screen and the second detector is placed at the second screen,
the first screen and the second screen are visible by the driver,
the part of the at least one rear-view vision image and the part of the additional rear-view vision image for displaying are selected based on the position of the driver's head to adjust the rear-view vision angle and the additional rear-view vision angle,
adjusting the rear-view vision angle extends a field of view of the rear-view vision, and
adjusting the additional rear-view vision angle further extends the field of view of the rear-view vision.

9. The rear-view vision device according to claim 1, wherein the first single camera, the image generator, the first screen, and the first detector are disposed in a left-hand housing in the motor vehicle, and wherein the second single camera, the second screen, and the second detector are disposed in a right-hand housing in the motor vehicle.

* * * * *